June 18, 1968  R. J. INGHAM  3,388,601

PRESSURE GAUGE SAFETY CONSTRUCTION

Filed April 9, 1965

INVENTOR.
ROBERT J. INGHAM

BY *Darby & Darby*

ATTORNEYS

United States Patent Office 3,388,601
Patented June 18, 1968

3,388,601
PRESSURE GAUGE SAFETY CONSTRUCTION
Robert Joseph Ingham, Fairfield, Conn., assignor to Dresser Industries, Inc., Stratford, Conn., a corporation of Delaware
Filed Apr. 9, 1965, Ser. No. 446,896
6 Claims. (Cl. 73—431)

ABSTRACT OF THE DISCLOSURE

A fluid pressure gauge with a crystal having a central area providing increased fracture susceptibility at relatively lower pressures than the remaining areas thereof.

---

This invention relates to the provision of means which can be characterized as a safety feature of a part of the construction of gauges used for indicating fluid pressures.

A main object of the invention is to provide a sealed gauge housing for the operating mechanism of such devices of which the transparent glass or crystal is a part and wherein the crystal is specifically constructed to fracture at relatively low internal pressures.

A further object of the invention is to provide in such a combination a construction wherein the gauge casing is capable of preventing the entry of fluids and moisture when subjected to external pressure.

Other objects of this invention will be apparent from the description of the embodiment of the invention selected for disclosure herein and illustrated in the accompanying drawings.

Figure 1:
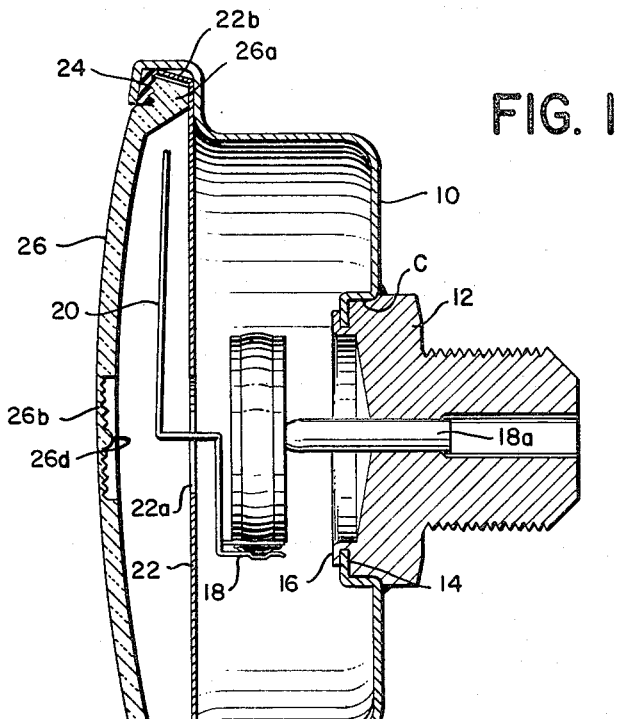
FIGURE 1 is a vertical, central, longitudinal cross-sectional view, clearly illustrating various details of construction contributing to the objects of this invention.
Figure 2:
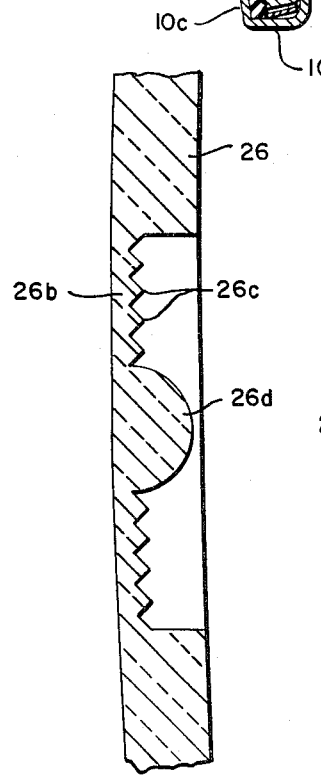
FIGURE 2 is an enlarged cross-sectional view of the central section of the gauge crystal.
Figure 3:
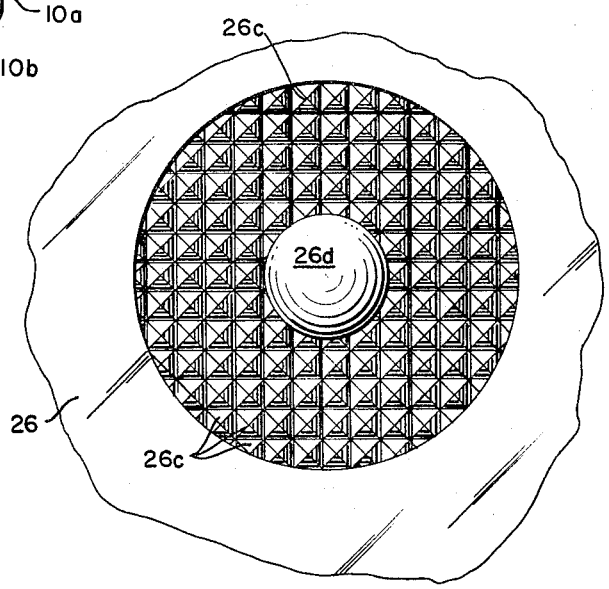
FIGURE 3 is a rear elevational view of the section illustrated in FIG. 2.

In the drawings the fluid pressure gauge illustrated includes a cup-shaped housing 10, made of suitable material, in this case metal. The casing is cup-shaped and at its open side has a radial flange 10a, continuing into an axial section 10b and terminating at an in-turned radial flange 10c.

The rear wall of the casing 10 is provided with a socket 12, which is externally threaded for connection to a pipe system, for example, and has a central passage for the admission of the fluid, the pressure of which is to be indicated. This socket fits into a central opening in the rear wall of the casing, which in the case illustrated is provided with a flanged reentrant section 14. The socket fits into this opening and has an axial extension which is deformed over the flange 14 in a radial direction, as illustrated at 16, to provide a permanent connection between the two. The joint between the casing and the socket is filled with a suitable sealing compound or cement, as indicated at C, which is preferably of the type which hardens to form a strong leakproof joint. It is diagrammatically illustrated at 18 how the operating mechanism is mounted within the casing, which is in this case a Bourdon spring. This spring is provided with a tubular extension 18a which is sealed in the socket 12 so as to permit the entry of pressure fluid into the spring in the usual manner. Mounted on the free end of the spring is a pointer 20, which is offset so that it may operate through a central aperture 22a in the dial 22. For the purposes of this invention the details of the operating mechanism are unimportant.

The dial is pressed against the radial flange 10a of the casing by a glass or crystal 26 when the flange 10c is in final position. As illustrated at the top of FIG. 1, the dial 22 has a series of radial tabs 22b, which engage the inside of the periphery of the enlarged rim 10b of the casing. The tabs 22b act as spring fingers to hold the dial in correct position until the crystal is secured by the flange 10c. The outer face of the rim 26a is serrated, as shown, and is engaged by an annular gasket 24 which can be made of any suitable material, such as, for example, neoprene of suitable hardness. As shown in FIG. 1, the radial terminal flange 10c on the casing is bent over the outer face of the gasket 24 and compressed to force the gasket to be deformed in the serrations on the rim of the crystal. This insures a fluid tight seal at the periphery of the crystal. Also the crystal forces the dial against the rim 10a. Since the entire casing is pressure tight, it is desirable to provide a pressure relief device in the event that there is a leak in the Bourdon tube system causing pressure in the case to rise when the gauge is put into operation.

To provide for such pressure relief, the central area of the crystal 26 is reduced in thickness as indicated at 26b which surrounds a center section 26d relatively less reduced in thickness. The central area around the section 26d is provided with vertical and horizontal serrations to form a cluster of peaks and valleys in a pattern of rectangular pyramids 26c. This results in a central area of reduced strength, which insures its fracture at predetermined low internal pressures. The serrations cause increased stress on the crystal material and by controlling their depth and size the fracture pressure can be established as desired at a level well below that pressure at which the major frontal area of the crystal will blow out.

It is pointed out that the rectangular pyramidal construction selected for illustrative purposes is not critical since other patterns could be used. At this point the object is to provide a central area of reduced thickness and structural formations which will result in increased stress under internal pressure, insuring pressure relief at safe predetermined values. Naturally, an important controlling condition will be the inherent strength of the material of the crystal which may be made of glass of various compositions or of various plastic materials. For example, a suitable plastic material for the crystal is cellulose acetate butyrate.

It is further emphasized that due to the sealing provided at the points of possible moisture entry damage to the interior construction can be prevented by excluding moisture except under very adverse conditions.

It is recognized that the provision of a fracture area to relieve safely undesired internal pressure insures that there is no likelihood of the violent ejection outwardly of crystal particles. In other words the crystal of this invention can be made to fracture at safe pressure levels which will not cause seriously forceful ejection of crystal fragments. Thus, safety to the viewer is insured.

From the above description it will be apparent to those skilled in the art that the subject matter of this invention is capable of some variation. It is preferred, therefore, that the scope of protection granted hereby be determined by the appended claims.

What is claimed:

1. A fluid pressure gauge comprising a casing having a transparent crystal forming one of its walls, a pressure fluid operated pressure indicating mechanism mounted in said casing, and a formation integral with said crystal comprising an area having serrations resulting in a reduced variable thickness in said area to fracture under predetermined internal pressures occurring in said casing.

2. A fluid pressure gauge comprising a casing having a transparent crystal forming one of its walls, a pressure fluid operated pressure indicating mechanism mounted in said casing, and a formation integral with said crystal comprising an area having serrations with horizontal and vertical components resulting in a reduced variable thickness in said area to fracture under predetermined internal pressures occurring in said casing.

3. A fluid pressure gauge comprising a casing having a transparent crystal forming one of its walls, a pressure fluid operated pressure indicating mechanism mounted in said casing, and a formation integral with said crystal comprising an area having horizontal and vertical components forming serrate pyramids and resulting in a reduced variable thickness in said area to fracture under predetermined internal pressures occurring in said casing.

4. A fluid pressure gauge comprising a casing, a pressure sensitive condition responsive element mounted within said casing, and a crystal mounted forming a wall of said casing and having an area providing increased fracture susceptibility at relatively lower pressures than remaining areas thereof, said first recited crystal area being at least partially comprised of a cluster of peaks and valleys affording reduced variable thickness thereat.

5. A gauge according to claim 4 in which said first recited crystal area also includes an integral section substantially free of said peaks and valleys.

6. In a gauge according to claim 5 in which said section extends centrally within the peaks and valleys portion thereat.

References Cited

UNITED STATES PATENTS

| | | | |
|---|---|---|---|
| 2,134,093 | 10/1938 | Ames | 73—431 |
| 2,560,793 | 7/1951 | Greene | 215—42 |
| 2,766,904 | 10/1956 | Phillip | 220—89 |
| 2,833,149 | 5/1958 | Aldridge et al. | 73—416 |
| 3,147,623 | 9/1964 | Johnson et al. | 73—431 X |
| 3,209,599 | 10/1965 | Harland et al. | 73—416 X |

DAVID SCHONBERG, *Primary Examiner.*

LOUIS R. PRINCE, *Examiner.*

D. M. YASICH, *Assistant Examiner.*